United States Patent
Newpol et al.

(10) Patent No.: US 7,852,753 B2
(45) Date of Patent: Dec. 14, 2010

(54) METHOD AND APPARATUS FOR CENTRALIZED SELECTION OF A CONTROL NETWORK

(75) Inventors: Richard S. Newpol, Seven Fields, PA (US); James R. Bryant, Cranberry Township, PA (US); Lei G. Chen, Sunnyvale, CA (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 152 days.

(21) Appl. No.: 12/192,717

(22) Filed: Aug. 15, 2008

(65) Prior Publication Data

US 2010/0040078 A1    Feb. 18, 2010

(51) Int. Cl.
*H04J 1/16* (2006.01)
(52) U.S. Cl. ........................ 370/221; 370/217; 370/225
(58) Field of Classification Search ........................ None
See application file for complete search history.

(56) References Cited

U.S. PATENT DOCUMENTS

| | | |
|---|---|---|
| 6,687,758 B2 | 2/2004 | Craft et al. |
| 2005/0198371 A1* | 9/2005 | Smith et al. ................. 709/238 |
| 2006/0039384 A1* | 2/2006 | Dontu et al. ................. 370/400 |
| 2008/0037418 A1 | 2/2008 | Cole et al. |
| 2008/0056122 A1 | 3/2008 | Madhi et al. |
| 2009/0201909 A1* | 8/2009 | Bou-Diab et al. ........... 370/351 |

OTHER PUBLICATIONS

"Checkpoint SPLAT Link Aggregation and High Availability with Bonding", Sep. 14, 2006, TLAnews.com, 2 pages.

* cited by examiner

*Primary Examiner*—Hong Cho
*Assistant Examiner*—Ajay P Cattungal
(74) *Attorney, Agent, or Firm*—Blakely Sokoloff Taylor & Zafman LLP

(57) ABSTRACT

An apparatus and method for centrally selecting a control network from redundant control networks is described. In one embodiment of the invention, a network element includes a first control network and a second control network. Each line card implements a bonding interface to bond a first port coupled with the first control network and a second port coupled with the second control network. On each line card, the first and second ports receive a control network selection message from the first and second control networks respectively. A link layer driver on each line card interprets those selection messages and determines which control network is active and reports that control network as up to the bonding interface and reports the other control network as down to the bonding interface. The bonding interface selects the control network reported as up and application software uses that control network.

20 Claims, 5 Drawing Sheets

METHOD AND APPARATUS FOR CENTRALIZED SELECTION OF A CONTROL NETWORK

BACKGROUND

1. Field

Embodiments of the invention relate to the field of network processing; and more specifically, to centralized selection of a control network.

2. Background

A Network element (e.g., a router, switch, bridge, etc.) is a piece of networking equipment, including hardware and software, that communicatively interconnects other equipment on the network (e.g., other network elements, computer end stations, etc.). A network element includes a physical chassis (sometimes referred to as a shelf), which includes one or more networking cards (e.g., line cards, control cards, etc.). Control cards may implement one or more control networks (e.g., the control card may include a switch chip implementing a control network). The control network performs signaling, routing (including creation of and/or management of routing tables), bridging (including creation of and/or management of bridging tables) connection setup, session setup, etc. The line cards handle packet processing including forwarding and/or switching at a high speed (e.g., the line cards include application layer software).

Some network elements include redundant control networks such that upon failure of an active control network, a standby control network assumes the role as the active control network. Typically each line card is coupled with the active control network and the standby control network. For example, for each of the line cards, a first port is coupled with a port of the active control network and a second port is coupled with a port of the standby control network. If the active control network fails, the line card switches to the standby control network (which assumes the role as the active control network).

Some network elements use application layer software on each line card to manage the interfaces to the control networks. For example, for each line card coupled with the active and standby control networks, during normal operation, application layer software selects the port coupled with the active control network. Since application layer software is used to manage the interfaces to the control networks, these ports typically require separate network addresses and are visible to network software. Thus, rogue software and/or incorrectly configured software may use either interface to the control networks.

A bonding interface aggregates multiple links to present a single logical interface to application layer software. For example, a bonding interface may bond two physical links to two physical network elements. The bonding interface selects one of the two links to use. If a network element includes multiple bonding interfaces that each bond two different links to the same two network elements, each bonding interface independently selects which link (and thus which network element) to use. Bonding interfaces typically use Address Resolution Protocol (ARP), or other link state protocols (e.g., media independent interface signal), to determine whether the selected link is up or down. If the selected link is down, the bonding interfaces switches to the other interface.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
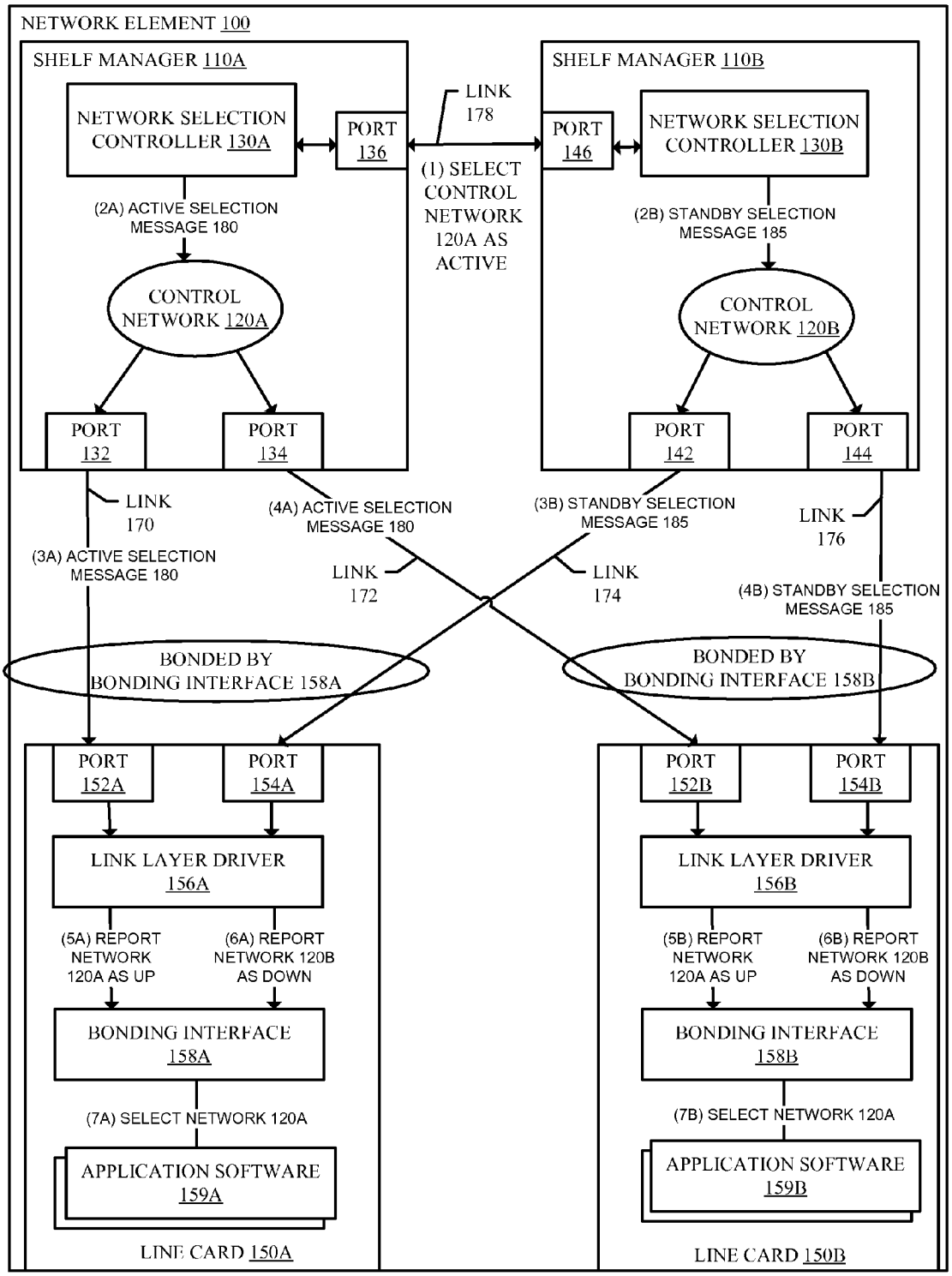
FIG. 1 is a data flow diagram illustrating an exemplary network element centrally managing selection of an active control network between redundant control networks according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and with other electronic devices over a network) code and data using machine-readable media, such as machine storage media (e.g., magnetic disks; optical disks;

random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Some network elements are multiple services network elements that provide support for multiple networking functions (e.g., routing, bridging, switching, Layer 2 aggregation, and subscriber management or any combination of routing, bridging, switching, Layer 2 aggregation, and subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network (wired or wirelessly) to edge network elements, which are coupled through one or more core network elements to the server computing end stations.

A method and apparatus for centralized selection of a control network from redundant control networks is described. In one embodiment of the invention, a network element includes redundant internal control networks (e.g., an active control network and a standby control network) which are each coupled with multiple networked entities (e.g., line cards). Thus, each networked entity is coupled with a first control network and separately coupled with a second control network. Further, each networked entity uses a bonding interface to group the links to the first control network and the second control network. Thus, from the view of the application software executing on each networked entity, a single interface exists to the control networks.

The network element includes one or more network selection controllers to select one of the control networks to be an active control network for each of the networked entities. The one or more network selection controllers further direct the bonding interface on each networked entity to use the active control network. Thus, at a given time, each of the networked entities use the same control network (the other control network is typically used for redundancy purposes). For example, the one or more network selection controllers broadcast a control network selection message on both of the redundant internal control networks. These selection messages include an indication of the control network the network selection controller selected to be the active control network. Each networked entity receives and processes the selection messages (e.g., at a link layer driver) and reports the selected control network to its bonding interface. The bonding interface then causes the application software to use the active control network.

FIG. 1 is a data flow diagram illustrating an exemplary network element 100 centrally managing selection of an active control network from the redundant control networks 120A and 120B according to one embodiment of the invention. FIG. 1 will be described with reference to the exemplary operations of FIG. 4, however, it should be understood that the operations of FIG. 1 can be performed by embodiments of the invention other than those discussed with reference to FIG. 4, and the embodiments discussed with reference to FIG. 4 can perform operations different than those discussed with reference to FIG. 1.

The network element 100 includes the shelf managers 110A and 110B and the line cards 150 and 160. It should be understood that the network element 100 illustrated in FIG. 1 is an example of the architecture of a network element and other, alternative architectures, may be used in embodiments of the invention described herein (e.g., more or less shelf managers and/or line cards, additional types of cards (e.g., ASE cards, etc.)). The shelf managers 110A and 110B include the network selection controllers 130A-130B and the control networks 120A-120B respectively. The shelf manager 110A includes the ports 132, 134, and 136. The shelf manager 110B includes the ports 142, 144, and 146. The shelf managers 110A-110B are coupled through the ports 136 and 146 respectively. For example, the shelf managers 110A-110B communicate through the ports 136 and 146 over the link 178. In one embodiment of the invention, the ports 136 and 146 are out-of-band ports.

The control networks 120A-120B perform signaling, routing (including creation of and/or management of routing tables), bridging (including creation of and/or management of bridging tables) connection setup, session setup, etc. In one embodiment of the invention, the control networks 120A-120B are each implemented on switch chips (e.g., Ethernet switch chips). In addition, the control networks 120A-120B are redundant control networks. For example, at any given time, either the control network 120A or the control network 120B is the active control network and the other control network is the standby control network.

The line cards 150A and 150B include the ports 152A-152B and 154A-154B, the link layer drivers 156A-156B, the bonding interfaces 158A-158B, and application software 159A-159B respectively. The line cards 150A-150B are each coupled with the control network 120A and the control network 120B. For example, the line card 150A is coupled with the control network 120A over the link 170 (which connects the ports 132 and 152A); and is coupled with the control network 120B over the link 174 (which connects the ports 142 and 154A). The line card 150B is coupled with the control network 120A over the link 172 (which connects the ports 134 and 152B); and is coupled with the control network 120B over the link 176 (which connects the ports 144 and 154B). Thus, the line card 150A may communicate with the control networks 120A-120B over the links 170 and 174 respectively (e.g., receive control messages from the control networks 120A-120B at the ports 152A and 154A respectively), and the line card 150B may communicate with the control networks 120A-120B over the links 172 and 176 respectively (e.g., receive control messages from the control networks 120A-120B at the ports 152B and 154A respectively).

In one embodiment of the invention, among other things, the link layer drivers 156A-156B interpret control messages received from the control networks 120A-120B on the ports 152A-152B and 154A-154B respectively, which will be described in greater detail later herein. According to one embodiment of the invention, the link layer drivers 156A-156B are Ethernet drivers. The link layer drivers 156A-156B are coupled with the bonding interfaces 158A-158B respectively.

The bonding interface 158A bonds the ports 152A and 154A and presents a single interface to the application software 159A. Similarly, the bonding interface 158B bonds the ports 152B and 154B and presents a single interface to the application software 159B. For example, the application software 159A-159B does not have knowledge of the redundant control networks 120A-120B and does not select which control network 120A-120B to use. Thus, the application software 159A-159B uses the control network that the bonding interfaces 158A-159B respectively presents. As will be described in greater detail later herein, the bonding interfaces 158A-158B are directed to select a particular control network for the application software 159A-159B respectively to use. At any given time, application software 159A-159B uses the same control network (e.g., either the control network 120A or the control network 120B).

Figure 4:
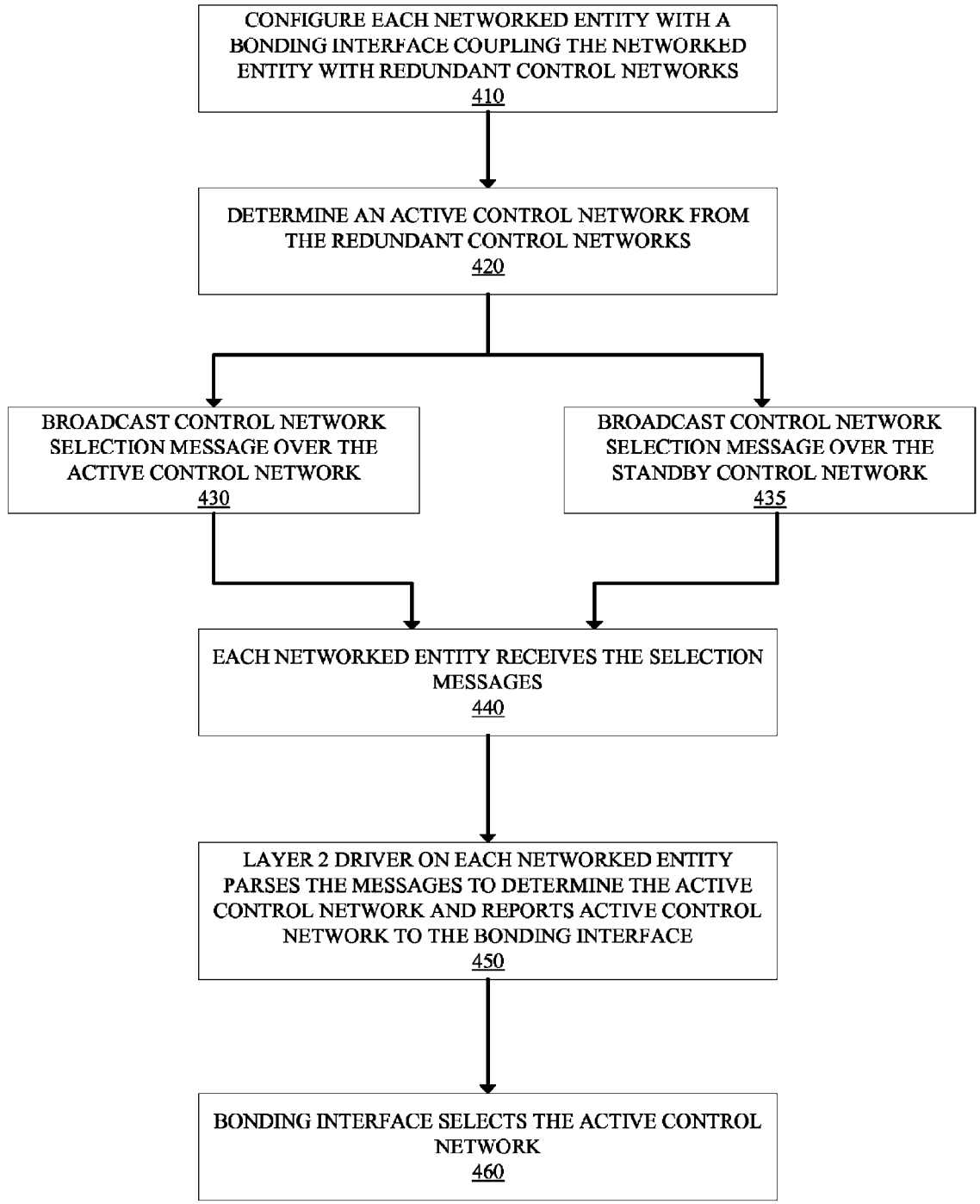
FIG. 4 is a flow diagram exemplary illustrating centralized network selection of redundant control networks according to one embodiment of the invention.

FIG. 4 is a flow diagram exemplary illustrating centralized network selection of redundant control networks according to one embodiment of the invention. At block 410, each networked entity is configured with a bonding interface that couples that networked entity with redundant control networks. For example, with reference to FIG. 1, the bonding interfaces 158A and 158B are configured to couple the line cards 150A and 150B with the control networks 120A and 120B respectively. According to one embodiment of the invention, a system and/or network administrator configures the bonding interfaces 158A and 158B (e.g., through use of a command line interface and/or other user interfaces). Flow moves from block 410 to block 420.

At block 420, an active control network is determined from the redundant control networks (e.g., one of the redundant control networks is selected to be the active control network and the other control network is selected to be the standby control network). With reference to FIG. 1, at operation 1, the network selection controllers 130A-130B select one of the control networks 120A-120B to be the active control network. For example, the network selection controllers 130A-130B negotiate which control network should be active (e.g., over the link 178). The network selection controllers 130A-130B may consider several factors when determining which control network 120A-120B should be the active control network. In FIG. 1, the network selection controllers 130A-130B have selected the control network 120A to be the active control network (thus the control network 120B is the standby control network). Therefore, throughout the description of FIGS. 1 and 4, the control network 120A is considered to be the active control network and the control network 120B is the standby control network. In another embodiment of the invention, a system administrator configures the functions of the redundant control networks 120A and 120B (e.g., which of the redundant control networks 120A-120B is active and which is the standby). Flow moves from block 420 to blocks 430 and 435.

Figure 3:
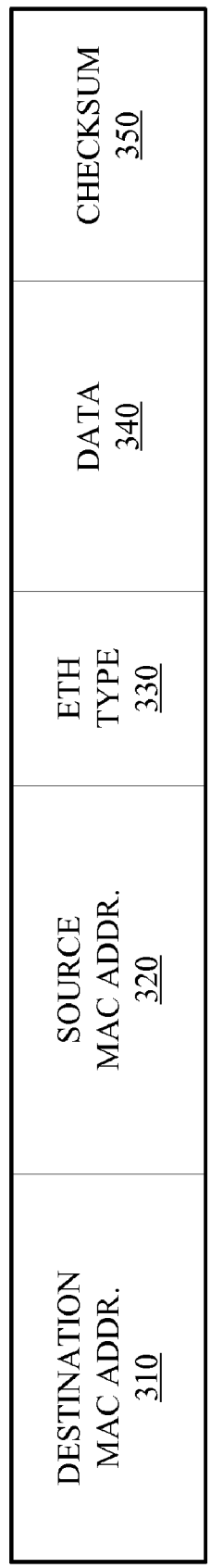
FIG. 3 illustrates an exemplary control network selection message format according to one embodiment of the invention.

At block 430, a control network selection message (hereinafter "selection message") which indicates that the control network 120A is active is broadcast over the control network 120A (e.g., the message is transmitted to the networked entities coupled with the control network 120A). At block 435, a selection message which indicates that the control network 120B is a standby control network is broadcast over the control network 120B (e.g., the message is transmitted to the networked entities coupled with the control network 120B). For example, with reference to FIG. 1, the network selection controllers 130A-130B cause a selection message to be broadcasted on the control networks 120A-120B to communicate the control network selection. For example, these selection messages include an indication of which of the control networks 120A-120B is the active control network. In one embodiment of the invention, these selection messages are data link layer (layer 2) protocol messages. For example, FIG. 3 illustrates an Ethernet frame format 300 that may be used as a selection message in some embodiments of the invention. The Ethernet frame 300 includes the destination MAC address field 310, the source MAC address field 320, the EthType field 330, the data field 340, and the checksum field 350. In one embodiment of the invention, the EthType field 330 indicates whether a particular control network is active or standby. For example, in some embodiments of the invention, a specialized EthType is created which indicates whether the control network the frame is sent on is "up" or "down" ("up" refers to the active control network and "down" refers to the standby control network). Of course, it should be understood that in other embodiments of the invention other data link layer messages may be used to communicate the control network selection and/or or different mechanisms may be used to communicate the control network selection (e.g., shared memory).

Thus, at operation 2A, the network selection controller 130A broadcasts the active selection message 180 on the control network 120A (through the ports 132 and 134) which includes an indication that the control network 120A is active. At operation 2B, the network selection controller 130B broadcasts the standby selection message 185 on the control network 120B (through the ports 142 and 144) which includes an indication that the control network 120B is the standby control network. At operations 3A and 3B, the active selection messages 180 are transmitted on the links 170 and 172 to the ports 152A and 152B respectively. At operations 4A and 4B, the standby selection messages 185 are transmitted on the links 174 and 176 to the ports 152A and 154B respectively. With reference to FIG. 4, flow moves from blocks 430 and 435 to block 440.

At block 440, each networked entity receives the selection messages. For example, with reference to FIG. 1, each of the line cards 150A and 150B receive the active selection message 180 and the standby selection message 180. The selection messages received at the ports 152A and 154A are passed to the link layer driver 156A. Similarly, the selection messages received at the ports 152B and 154B are passed to the link layer driver 156B. Flow moves from block 440 to block 450.

At block 450, a link layer driver on each networked entity parses the selection messages to determine the active control network and the standby control network and reports the results to the bonding interface. For example, with reference to FIG. 1, the link layer drivers 156A and 156B interpret the selection messages 180 and 185 to determine the status of the control networks 120A and 120B respectively (e.g., which control network is active). For example, in one embodiment of the invention, with reference to FIG. 3, the link layer drivers 156A and 156B parse the selection messages to determine the value of the EthType field 330. To illustrate, the link layer driver 156A parses the active selection message 180 (received at the port 152A) to determine that the control network 120A is active, and further parses the standby selection message 185 (received at the port 154A) to determine that the control network 120B is a standby control network. Similarly, the link layer driver 156B parses the active selection message 180 (received at the port 152B) to determine that the control network 120A is active, and further parses the standby selection message 185 (received at the port 154B) to determine that the control network 120B is a standby control network.

The link layer drivers 156A and 156B further report the status of the control networks to the bonding interfaces 158A and 158B respectively. In one embodiment of the invention, the bonding interfaces 158A and 158B selects an interface to use from the interfaces that are "up" (e.g., operational). Thus, the link layer drivers 156A and 156B report the control network that is active (as indicated by the selection messages) as "up" and the control network that is standby as "down". Thus, at operations 5A and 5B, the bonding interfaces 158A and 158B report the control network 120A is "up" (e.g., control messages may be sent and received between the control network 120A and the ports 152A and 152B). At operations 6A and 6B, the bonding interfaces 158A and 158B report the control network 120B is "down." With reference to FIG. 4, flow moves from block 450 to block 460.

At block 460, the bonding interface selects the active control network. Thus, the application software uses the active control network as selected by the bonding interface. With reference to FIG. 1, since the bonding interfaces 158A and 158B select only "up" interfaces, at operations 7A and 7B the bonding interfaces 158A and 158B each select to use the control network 120A respectively. Thus, the application software 159A and 159B use the control network 120A as selected by the bonding interfaces 158A and 158B respectively. Since the application software 159A and 159B did not select which control network to use (e.g., the bonding interfaces 158A and 158B effectively hide the selection of the control networks) the application software 159A and 159B do not have knowledge of the redundant control networks, and cannot select between the redundant control networks. Therefore, rogue applications and/or misconfigured applications cannot independently select a particular control network to use (e.g., the standby control network).

Since the network selection controllers 130A and 130B select which control network is active and direct the link layer drivers 156A and 156B to report only the selected control network as up to the bonding interfaces 158A and 158B respectively (the other control networks are reported as down), a centralized network selection control results. In addition, since the bonding interfaces 158A and 158B use only the selected control network (i.e., the active control network), the application software 159A and 159B cannot independently select the standby control network.

Figure 2:
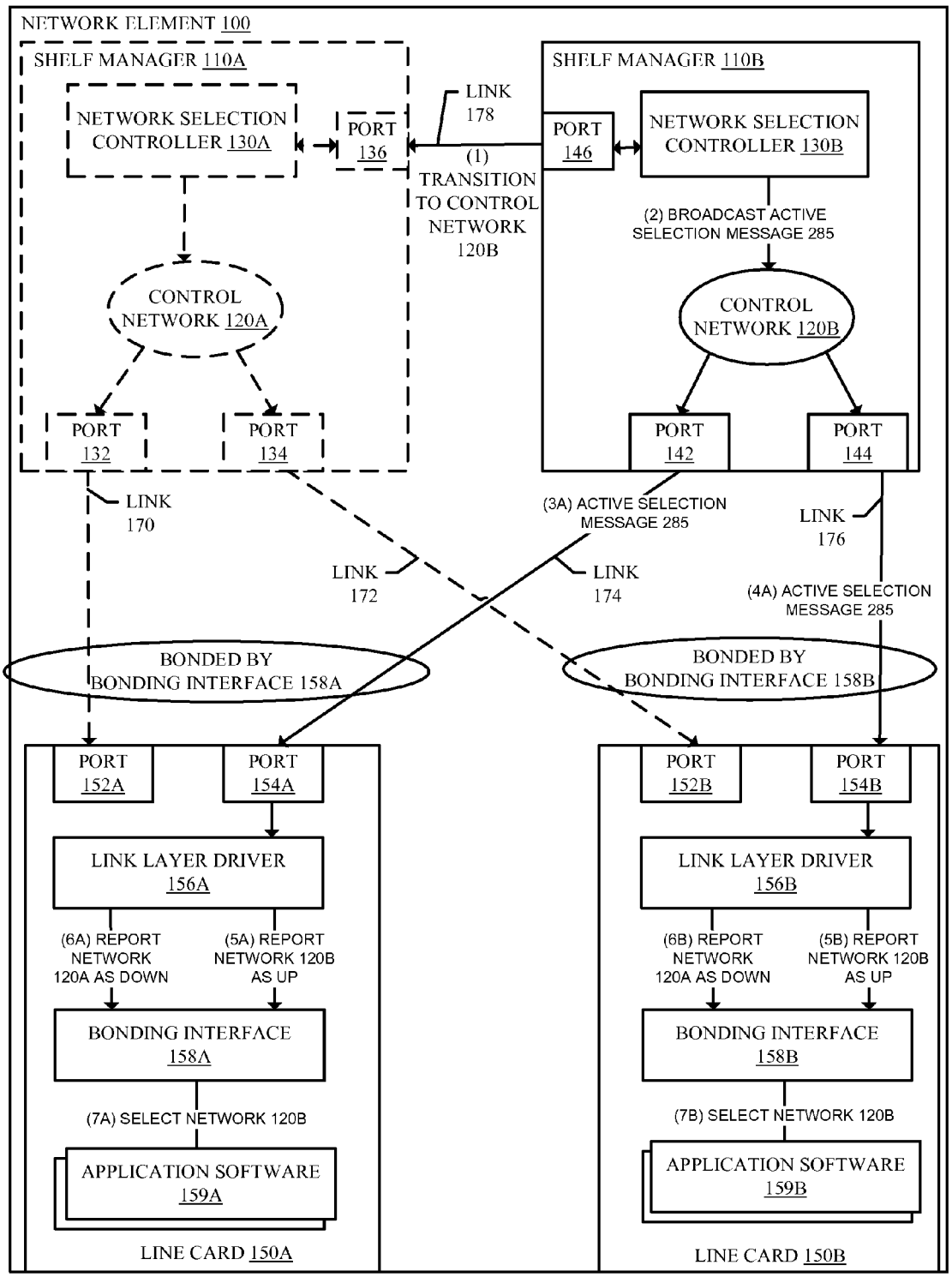
FIG. 2 is a data flow diagram illustrating the exemplary network element of FIG. 1 centrally managing the transition from a standby control network to an active control network according to one embodiment of the invention.
Figure 5:
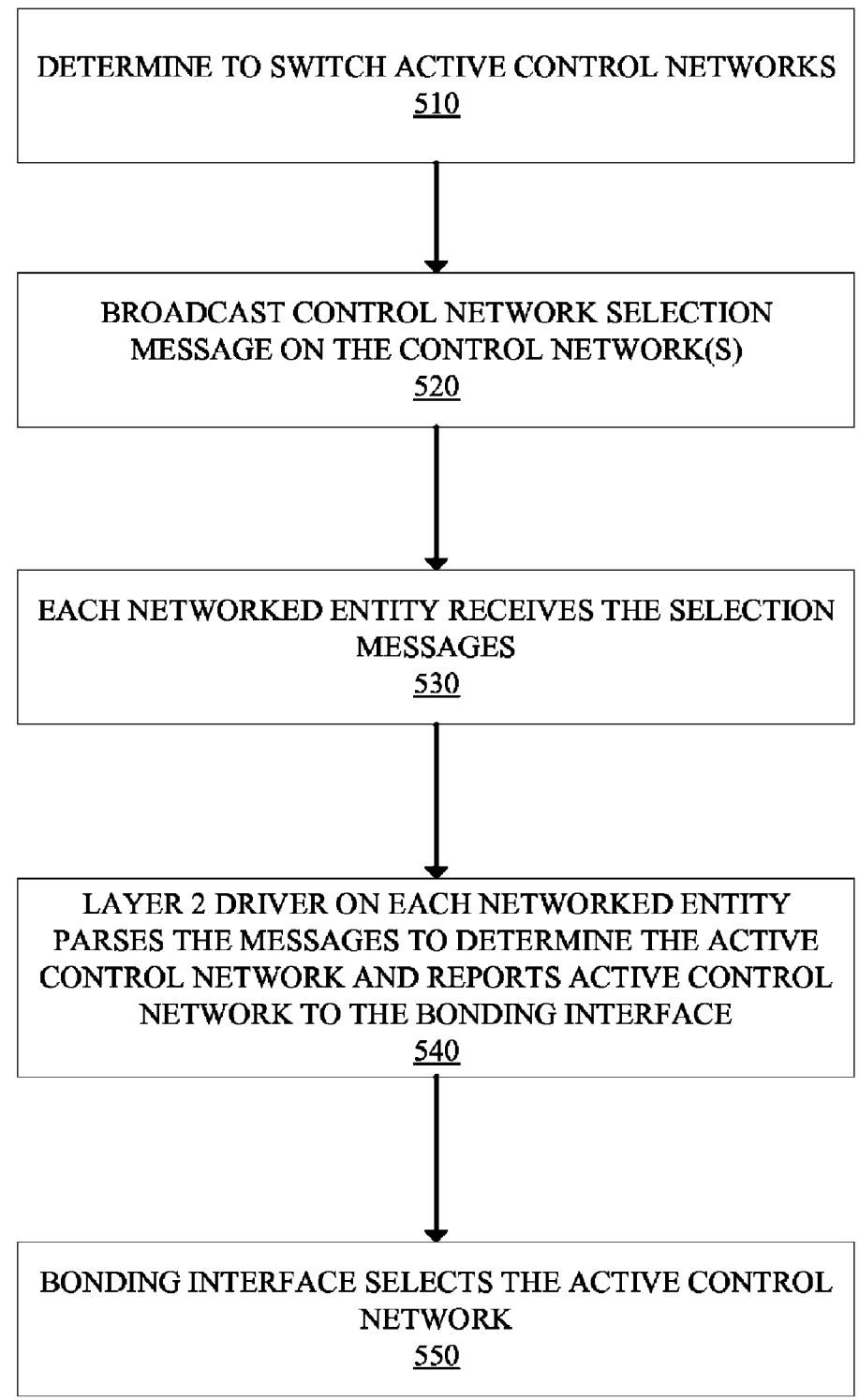
FIG. 5 is a flow diagram exemplary illustrating centrally managing the transition from a standby control network to an active control network according to one embodiment of the invention.

The network element 100 may switch between the redundant control networks 120A and 120B (e.g., if the active control network fails, if the redundant control network is being updated/maintained, for performance reasons, etc.). For example, FIG. 2 is a data flow diagram illustrating the exemplary network element 100 centrally managing the transition from a standby control network to an active control network according to one embodiment of the invention. FIG. 2 will be described with reference to the exemplary operations of FIG. 5, however, it should be understood that the operations of FIG. 2 can be performed by embodiments of the invention other than those discussed with reference to FIG. 5, and the embodiments discussed with reference to FIG. 5 can perform operations different than those discussed with reference to FIG. 1. FIG. 5 is a flow diagram exemplary illustrating centrally managing the transition from a standby control network to an active control network according to one embodiment of the invention.

With reference to FIG. 5, at block 510, the network element determines to switch active control networks. For example, with reference to FIG. 1, the shelf manager 110A (which includes the previously active control network 120A) is offline (e.g., the shelf manager 110 has failed, being updated, etc.). In one embodiment of the invention, the shelf manager 110B detects the status of the shelf manager 110A by periodically transmitting keep-alive messages to the shelf manager 110A via the link 178. Thus, since the control network 120A is not available, the network element 100 transitions the standby control network 120B to be the new active control network. Of course, it should be understood that the network element may determine to switch active control networks for other reasons (e.g., performance reasons, etc.). In addition, a system administrator may cause the role of the control networks to transition. Thus, in some embodiments of the invention, the redundant control networks are performing correctly when the transition is made. Additionally, in some embodiments of the invention, the failure of one or more interfaces of the networked entities (e.g., one or more line cards) may trigger the transition. For example, if a networked entity loses connection to the active control network (e.g., link between the active control network and that networked entity fails), the system may determine to transition the standby control network to become the new active control network. After determining to transition control networks, flow moves from block 510 to block 520.

At block 520, a selection message is broadcast over the control networks which indicates the role of the control networks. For example, with reference to FIG. 2, at operation 2, the network selection controller 130B broadcasts the active selection message 285 over the control network 120B (through the ports 142 and 144) which includes an indication that the control network 120B is the active control network. At operations 3A and 4A, the active selection message 285 is transmitted on the links 174 and 176 to the ports 154 and 164 respectively. Similarly as described with reference to FIG. 1, in one embodiment of the invention the selection message 285 is a Ethernet frame with a customized EthType field that indicates that the control network 120B is "up." With reference to FIG. 5, flow moves from block 520 to block 530.

At block 530, each networked entity receives the selection messages. For example, with reference to FIG. 2, each of the line cards 150A and 150B receive the active selection message 285. The selection message 285 received at the ports 154 and 164 are passed to the link layer drivers 156A and 156B respectively. Flow moves from block 530 to block 540.

At block 540, a link layer driver on each networked entity parses the selection messages to determine the active control network and the standby control network and reports the results to the bonding interface. For example, with reference to FIG. 2, the link layer drivers 156A and 156B interpret the selection message 285 to determine the status of the control network that the message was received on. For example, in one embodiment of the invention, with reference to FIG. 3, the link layer drivers 156A and 156B parse the selection messages to determine the value of the EthType field 330. Thus, the link layer drivers 156A and 156B each interpret the selection message 285 and determine that the control network 120B, which previously had a status of "down", now has a status of "up". In addition, according to one embodiment of the invention, only one control network may have a status of "up" at any given time. Thus, since the selection message 285 indicates that the control network 120B is "up", the link layer drivers 156A and 156B determine that the control network 120A is "down". Alternatively and/or additionally, the link layer drivers 156A and 156B report the status of a particular control network as "down" if it does not receive a message from that control network in a given period of time.

The link layer drivers 156A and 156B report the status of the control networks to the bonding interfaces 158A and 158B respectively. Thus, at operations 5A and 5B, the bonding interfaces 158A and 158B report the control network 120B is "up". In addition, at operations 6A and 6B, the bonding interfaces 158A and 158B report the control network 120A is "down." With reference to FIG. 5, flow moves from block 540 to block 550.

At block 550, the bonding interface selects the active control network. Thus, the application software uses the active control network as selected by the bonding interface. With reference to FIG. 2, since the bonding interfaces 158A and 158B select only "up" interfaces, at operations 7A and 7B the bonding interfaces 158A and 158B each select to use the control network 120B respectively. Thus, the application software 159A and 159B use the control network 120B as selected by the bonding interfaces 158A and 158B respectively. Thus, since the network selection controller 130B directed the link layer drivers 156A and 156B to report that the control network 120B is "up" to the bonding interfaces 158A and 158B respectively, a centralized control network transitioning results. Thus, all of the networked entities (e.g., all of the line cards coupled with the redundant control networks) may switch redundant control networks, at the direction of the network selection controller, at approximately the same time. Thus, each networked entity uses the same control network at any given time.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for centrally selecting a control network from redundant control networks of a network element, wherein the network element includes a first control network, a second control network, and a plurality of line cards, wherein each of the plurality of line cards includes a first port coupled with the first control network and a second port coupled with the second control network, each line card further including a link layer driver, a bonding interface, and application software, the method comprising:

bonding the first port of each line card with the second port of each line card respectively with a bonding interface; and each of the plurality of line cards receiving a first control network selection message on the first control network and a second control network selection message on the second control network at the first and second port respectively, and performing the following:

the link layer driver determining, from the first and second control network selection messages, which one of the first and second control networks is active, and reporting that determination to the bonding interface, and the bonding interface selecting the port that corresponds to the active control network, wherein the application software uses the selected active control network.

2. The method of claim 1, further comprising wherein each of the application software on the plurality of line cards uses the same control network at any given time.

3. The method of claim 1, wherein the first and second control networks are implemented on a first and second shelf manager respectively, the first and second shelf manager including a first and second network selection controller, the method further comprising:

the first network selection controller broadcasting the first control network selection message on the first control network to the first port of each of the plurality of line cards, the first control network selection message indicating whether the first control network is active;

the second network selection controller broadcasting the second control network selection message on the second control network to the second port of each of the plurality of line cards, the second control network selection message indicating whether the second control network is active.

4. The method of claim 3, further comprising the first and second network selection controllers each determining which of the control networks to set as the active control network.

5. The method of claim 4, wherein the selected active control network is the first control network, and wherein the method further comprises:

determining to transition the active control network from the first control network to the second control network;

the second network selection controller broadcasting a third control network selection message through the second control network to the second port of each of the plurality of line cards;

each of the plurality of line cards receiving the third control network selection message at the second port, and performing the following:

determining that the second control network is active and reporting to the bonding interface that the second control network is active and the first control network is not active, and the bonding interface selecting the second control network; and wherein the application software on each of the plurality of line cards uses the second control network without knowledge of the first control network and without knowledge of the transition.

6. The method of claim 5, wherein each of the selection messages are layer 2 (link-layer) protocol messages.

7. The method of claim 6, wherein the layer 2 (link-layer) protocol is Ethernet, and wherein each of the selection messages are Ethernet frames including an EtherType field indicating whether the corresponding control network is active.

8. A network element to centrally manage selection of an active control network between a first control network and a redundant second control network, the network element comprising:

a first network selection controller, to determine which one of the first and second control networks is active, and to broadcast a first control network selection message on the first control network to a plurality of line cards, the first selection message to indicate which of the first or second control networks is active; and the plurality of line cards each coupled with the first and second control networks, the plurality of line cards each including the following:

a first and second port to be coupled with the first and second control network respectively, the first port to receive the first control network selection message, a link layer driver to parse the received first control network selection message to determine which of the control networks is active and report that determination to a bonding interface on the line card, and the bonding interface to bond the first and second ports and to cause application software on the line card to use the control network determined to be active as reported by the link layer driver.

9. The network element of claim 8, wherein the first control network selection message on the first control network is to indicate that the first control network is active, and further comprising:
- a second network selection controller to broadcast a second control network selection message on the second control network to each of the plurality of line cards, the second control network selection message to indicate that the second control network is not active; and
- each of the plurality of line cards further to include a second port to receive the second control network selection message, wherein the link layer driver on each line card is to parse the received second control network selection message to determine that the second control network is not active and report that determination to the bonding interface on that line card.

10. The network element of claim 9, wherein each of the application software on the plurality of line cards uses the same control network at any given time.

11. The network element of claim 9, further comprising:
- the second network selection controller to select the second control network as active in response to a determination to switch active control networks, the second network selection controller to broadcast a third control network selection message on the first and second control networks to each of the plurality of line cards, the third control network selection message to indicate that the second control network is active; and
- on each line card, the link layer driver to parse the third control network selection message determine and report to the bonding interface that the second control network is active and the first control network is not active, and wherein the bonding interface is to cause the application software to use the second control network.

12. The network element of claim 9, wherein each of the selection messages are layer 2 (link-layer) protocol messages.

13. The network element of claim 12, wherein the layer 2 (link-layer) protocol is Ethernet, and wherein each of the selection messages are Ethernet frames including an EtherType field indicating whether the corresponding control network is active.

14. A non-transitory machine-readable storage medium that provides instructions that, if executed by a processor, will cause said processor to perform operations for centrally selecting a control network from redundant control networks of a network element, wherein the network element includes a first control network, a second control network, and a plurality of line cards, wherein each of the plurality of line cards includes a first port coupled with the first control network and a second port coupled with the second control network, each line card further including a link layer driver, a bonding interface, and application software, comprising:
- bonding the first port of each line card with the second port of each line card respectively with a bonding interface; and
- each of the plurality of line cards receiving a first control network selection message on the first control network and a second control network selection message on the second control network at the first and second port respectively, and performing the following:
  - the link layer driver determining, from the first and second control network selection messages, which one of the first and second control networks is active, and reporting that determination to the bonding interface, and
  - the bonding interface selecting the port that corresponds to the active control network, wherein the application software uses the selected active control network.

15. The machine-readable storage medium of claim 14, further comprising wherein each of the application software on the plurality of line cards uses the same control network at any given time.

16. The machine-readable storage medium of claim 14, wherein the first and second control networks are implemented on a first and second shelf manager respectively, the first and second shelf manager including a first and second network selection controller, the method further comprising:
- the first network selection controller broadcasting the first control network selection message on the first control network to the first port of each of the plurality of line cards, the first control network selection message indicating whether the first control network is active;
- the second network selection controller broadcasting the second control network selection message on the second control network to the second port of each of the plurality of line cards, the second control network selection message indicating whether the second control network is active.

17. The machine-readable storage medium of claim 16, further comprising the first and second network selection controllers each determining which of the control networks to set as the active control network.

18. The machine-readable storage medium of claim 17, wherein the selected active control network is the first control network, and wherein the method further comprises:
- determining to transition the active control network from the first control network to the second control network;
- the second network selection controller broadcasting a third control network selection message through the second control network to the second port of each of the plurality of line cards;
- each of the plurality of line cards receiving the third control network selection message at the second port, and performing the following:
  - determining that the second control network is active and reporting to the bonding interface that the second control network is active and the first control network is not active, and
  - the bonding interface selecting the second control network; and
- wherein the application software on each of the plurality of line cards uses the second control network without knowledge of the first control network and without knowledge of the transition.

19. The machine-readable storage medium of claim 18, wherein each of the selection messages are layer 2 (link-layer) protocol messages.

20. The machine-readable storage medium of claim 19, wherein the layer 2 (link-layer) protocol is Ethernet, and wherein each of the selection messages are Ethernet frames including an EtherType field indicating whether the corresponding control network is active.

* * * * *